US006685355B2

(12) United States Patent
Kuwahara

(10) Patent No.: US 6,685,355 B2
(45) Date of Patent: Feb. 3, 2004

(54) LINEAR MOTION GUIDE UNIT

(75) Inventor: Hideki Kuwahara, Kanagawa-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 29 days.

(21) Appl. No.: 10/058,275

(22) Filed: Jan. 30, 2002

(65) Prior Publication Data

US 2002/0102035 A1 Aug. 1, 2002

(30) Foreign Application Priority Data

Jan. 30, 2001 (JP) ........................................ 2001-020976

(51) Int. Cl.[7] .............................................. F16C 29/06
(52) U.S. Cl. ........................................... 384/45; 384/44
(58) Field of Search .............................. 384/43, 44, 45, 384/49

(56) References Cited

U.S. PATENT DOCUMENTS

| | | | | |
|---|---|---|---|---|
| 2,775,129 A | * | 12/1956 | Peras | |
| 2,846,050 A | * | 8/1958 | Craggs et al. | |
| 2,936,166 A | * | 5/1960 | Wise | |
| 4,674,893 A | * | 6/1987 | Teramachi | 384/45 |
| 4,932,279 A | * | 6/1990 | Kasuga | 384/45 |
| 4,934,834 A | * | 6/1990 | Morita | 384/45 |
| 5,102,235 A | * | 4/1992 | Mugglestone | 384/45 |
| 5,829,883 A | * | 11/1998 | Kawaguchi et al. | 384/45 |
| 6,170,986 B1 | * | 1/2001 | Hsu et al. | 384/15 |
| 6,200,031 B1 | * | 3/2001 | Faulhaber et al. | 384/45 |
| 6,328,474 B1 | * | 12/2001 | Fujiwara et al. | 384/13 |
| 6,481,893 B1 | * | 11/2002 | Greiner | 384/45 |

* cited by examiner

Primary Examiner—Thomas R. Hannon
(74) Attorney, Agent, or Firm—Browdy and Neimark, P.L.L.C.

(57) ABSTRACT

A linear motion guide unit is disclosed, in which components are assembled in a mutually fitting relation with one another into a composite construction. This allows reducing the number of components to cope with a modern tendency of miniaturization of the linear motion guide system. The slider is mainly composed of a carriage and a composite carriage frame. The carriage includes an upper major section and a pair of sidewise opposing wings depending downward from the major section, while the composite carriage frame includes end caps facing forward and aft ends of the carriage, one to each end, and side walls integral with the end caps. The composite carriage frame is made up of a first composite component and a second composite component that is held around the first composite component. The carriage is on the forward and aft ends thereof with first engaging means of concavities while the composite carriage frame has second engaging means of convexities that mate in a fitting engagement with the first engaging means to make sure of securely holding the composite carriage frame on the carriage.

19 Claims, 6 Drawing Sheets

LINEAR MOTION GUIDE UNIT

BACKGROUND OF THE INVENTION

1. Field of the Invention

The present invention relates to a linear motion guide unit adapted for use in various types of machinery such as diverse industrial robots, semiconductor manufacturing machines, precision machines, machine tools, and so on.

2. Description of the Prior Art

Most linear motion guide units have been used extensively between relatively movable parts to meet desired functional demands; for example, high precision, high speed, miniaturization, and so on in diverse fields of machinery such as various industrial robots, semiconductor manufacturing apparatus, testing instruments, machine tools, and so on. In recent years the linear motion guide unit, besides ensuring the improved performance such as high precision, high speed, and so on, needs refining on maintenance-free property and also to be miniaturized or made very small in construction. To do this, members and parts making up the linear motion guide unit are made as small as possible in construction, and reduced in their number to lessen the manufacturing steps and any inaccuracy resulting from assembly thereof. This industrial tendency eventually needs to make the members and parts integral in modular construction that all of elements will go together without any processing operation such as boring of small hole, drilling of tiny screwed hole, joining with mechanical fasteners, and so on. While the linear motion guide unit comes to play an indispensable element in modern industrial machines, and therefore is made in a wide range of sizes and used in a variety of types, diverse machines including semiconductor fabricating equipment and assembly machines are in need of a miniature linear motion guide unit in which a slider is allowed to move smoothly along a guide track.

Bearing means for linear sliding motion have been conventionally known, for example disclosed in Japanese Patent No. 2846050, in which a ball-recirculating passage is designed in a way lessening joints or discontinuities therein in number to allow the balls to run smoothly through there, and tiny parts are reduced in number to refine on the efficiency in assembling steps, thereby making it possible to complete the bearing means with an inexpensive cost and a very short time. The prior bearing means recited just above includes a track rail, a sliding platform movable on the track rail and more than one rolling element. The sliding platform has a metallic block of a thick plate integral with a pair of legs that is arranged underneath the thick plate and made with inside raceway grooves, each to each leg, for providing load raceways where the rolling elements run through there, an annular frame formed in a tetragonal configuration in top plan view so as to fit over the legs of the metallic block, the tetragonal frame being made on the underneath thereof with raceway grooves for providing non-loaded raceways that communicate with the load raceways to allow the rolling elements to recirculate through there and recesses that are formed forward and aft to fit over and conform to the track rail, and a pair of sidewise opposing elongated plates made on the upper surfaces thereof with raceway grooves that will form the non-loaded raceways where the rolling elements are allowed to run through there when the plates are joined together with the underneath of the tetragonal frame. The tetragonal frame has projections that will come into fitting engagement with grooves outside the legs to hold the tetragonal frame in assembled relation with the legs. Moreover, the tetragonal frame is made at the four corners thereof with holes in which pins fit to join the elongated plates with the tetragonal frame.

Disclosed in Japanese Patent No. 2775129 is a linear motion guide unit that a sliding block is comprised of a first component made therein with a non-loaded area of a ball-recirculating passage where rolling elements are allowed to run through there, a second metallic component made with a groove to define a load area of the ball-recirculating passage, and a pair of third components that fit between the first and second components at forward and aft ends of the sliding block.

Another prior linear motion guide arrangement is disclosed in Japanese Patent No. 2936166 in which there is shown a snap fastener that does not require any fastening screw to join together the components. With the prior linear motion guide arrangement recited just above, reversing bodies are secured on forward and aft ends of a carriage member by engaging lugs projecting out of the end faces of the reversing bodies on the upper surface of the carriage member. The combination of the carriage member with the forward and aft reversing bodies is accommodated in a guide carriage enclosure and secured to the enclosure by the action of the snap fasteners.

Nevertheless, the bearing means for linear sliding motion recited first, despite being envisaged to render it suitable for use in the miniature linear motion guide units, is so constructed as becoming adversely bulky in size because of the legs jutting out from the underneath of the thick plate of the block. Moreover, the construction that the non-loaded raceways or return passages are defined between the confronting annular frame and elongated plates results in rendering the sliding platform large in widthwise dimension. Any attempt to reduce the sliding platform in width will result in rendering the legs slim in their breadth, thus raising a major disadvantage of reducing the legs in rigidity or stiffness. On assembly to complete the sliding platform, the tetragonal frame is secured to the legs in a way the projections of the tetragonal frame click into the associated recesses formed on the outside surfaces of the legs. This construction will plague the workers with a troublesome exertion of bending forcibly the projections on the tetragonal frame to bring them into interlocking engagement with the inner recesses on the legs.

With the second linear motion guide unit recited earlier, the metallic second component, as being made lengthwise uniform in traverse cross-section, may be produced easily. Nevertheless, both the return passages and the turnarounds making up the non-loaded areas in the ball-recirculating circuits are mainly formed in the third component. Thus, the ball-recirculating circuits, which is provided in a composition of three components: the first, second and third components, will fail to make a tunnel round in traverse cross-section, especially at the turnarounds will become a passage U-shaped in cross section. This ball-recirculating circuit might cause any rattling sound or vibration especially when the small rolling elements run through there, thus interfering with a smooth running of the rolling elements. Besides, drilling operation of screwed holes is needed because of the construction in which fasteners are driven in the holes on the forward and aft ends of the second component to join together all components into an unit.

With the last linear motion guide arrangement recited earlier, the turnarounds and return passages making up the ball-recirculating circuits are formed in distinct components, independently: the reversing bodies made therein with the turnarounds, and the guide carriage enclosure made with the return passages. Such construction is tough of making the ball-recirculating circuits smooth, and also makes the guide carriage an intricate composition.

SUMMARY OF THE INVENTION

The present invention, therefore, has as its primary object to overcome the problems as stated earlier and particularly to provide a linear motion guide arrangement adapted for use in machinery that is legion in uses, industrial fields and made in a wade range of size. The present invention is more particular envisaged to provide a linear motion guide unit that is most preferable for use in very small machines. To this end, the linear motion guide unit of the present invention includes a slider movable on a track rail in a sliding manner, which is constituted with two components: a carriage and a composition carriage frame composed of end caps and side walls integral with the end caps. The components making up the slider contributes to a remarkable reduction of the desired parts and members in their numbers, and each of which has any engaging means that may come into mutually interlocking or fitting relation with a complementary engaging means of any counterpart, thus allowing to complete a composite construction with even no use of fasteners such as bolts, screws and so on.

The present invention is concerned with a linear motion guide unit; comprising a track rail having first raceway grooves on lengthwise sides thereof, a slider conforming to the track rail to fit over the track rail for movement relatively to the track rail and also having second raceway grooves confronting the first raceway grooves, and a ball-recirculating circuit allowing rolling elements to run through there, the ball-recirculating circuit including a load raceway defined between the first and second raceway grooves, a turnaround formed in the slider and connected at any one end thereof with the load raceway, and a return passage formed in the slider and connected to another end of the turnaround; wherein the slider is composed of a carriage including an upper major section extending in opposition to and parallel with an upper surface of the carriage and sidewise opposing wings depending downward from widthwise opposing side edges of the upper major section to extend over the lengthwise sides of the track rail, one to each side, and a composite carriage frame including end caps arranged on forward and aft ends of the carriage, one to each end, and side walls integral with the end caps and extending along sidewise outside surfaces of the carriage; and wherein the carriage has on the forward and aft ends thereof first engaging means, while the end caps have second engaging means that will come into fitting engagement with the first engaging means.

In one aspect of the present invention, a linear motion guide unit is disclosed in which the return passage in the slider is constituted with a first channel made lengthwise on the sidewise outside surface of any one of the wings of the carriage, and a second channel made lengthwise on an inside surface of any one of the side walls in opposition to the first channel.

In another aspect of the present invention, a linear motion guide unit is disclosed in which the first channel on the wing of the carriage is made semicircular in cross section and arranged to provide the return passage extending in parallel with the associated second raceway groove.

In another aspect of the present invention, a linear motion guide unit is disclosed in which at a corner where any one of the wings merges into the upper major section of the carriage there is provided a notched mark to indicate which side of the carriage is made with upper and side reference surfaces.

In another aspect of the present invention a linear motion guide unit is disclosed in which the first engaging means on the carriage is any one of first concavity and convexity, while the second engaging means on the end cap is any one of second convexity and concavity, which is complementary to the first engaging means to make fitting engagement between them.

In another aspect of the present invention, a linear motion guide unit is disclosed in which the convexity, whether the first or the second, is a pin circular in cross section and the concavity, whether the first or the second, is a hole circular in cross section.

In another aspect of the present invention, a linear motion guide unit constructed as defined in claim 1 wherein the upper major section of the carriage is made in a configuration that has a traverse cross-section uniform lengthwise throughout overall the length thereof.

In another aspect of the present invention, a linear motion guide unit is disclosed in which the composite carriage frame is made in a frame construction capable of accommodating the carriage.

In a further another aspect of the present invention a linear motion guide unit is disclosed in which the composite carriage frame is made warped elastically to allow the lengthwise opposing end caps to embrace the forward and aft ends of the carriage, whereby the second engaging means of the composite carriage frame come into fitting engagement with the first engaging means of the carriage to unite the composite carriage frame with the carriage.

In another aspect of the present invention, a linear motion guide unit is disclosed in which the composite carriage frame is composed of a first composite component that is made up of first inside end cap parts and first side wall panels integral with the first inside end cap parts, and a second composite component that is made up of second outside end cap up parts and second outside side wall panels integral with the second outside end cap parts.

In another aspect of the present invention, a linear motion guide unit is disclosed in which the first end cap part is composed of a first crossbar section and first legs, which are arranged to directly face the associated end face of the carriage, and the second end cap part is also composed of a second crossbar section and second legs, which are arranged to cover over the outermost face of the first end cap part.

In another aspect of the present invention, a linear motion guide unit is disclosed in which the first side wall panels fit in undercuts made in sidewise outsides of the carriage to provide upper halves of the side walls and further the second side wall panels conform underneath the first side wall panels, with coming into abutment with both undersurfaces of the first side wall panels and outside surfaces of the undercuts thereby providing lower halves of the side walls.

In another aspect of the present invention, a linear motion guide unit is disclosed in which the legs of the first end cap part are provided with third engaging means, while the second legs of the second end cap part are provided with fourth engaging means complementary to the third engaging means, so that fitting engagement between the third and fourth engaging means makes sure of joining together the first end cap part with the second end cap part.

In a further another aspect of the present invention, a linear motion guide unit is disclosed in which the third engaging means is either a pair of convexities rectangular in cross section or a pair of concavities rectangular in cross section, while the fourth engaging means is either a pair of concavities rectangular in cross section or a pair of concavities rectangular in cross section, which are complementary to the third engaging means.

In another aspect of the present invention, a linear motion guide unit is disclosed in which the first end cap parts of the first composite component each have the second engaging means, and an upper turnaround channel to define the turnaround, while the first side wall panels of the first composite component each have an upper second channel to form partly an upper region of the second channel, and further the second end cap parts of the second composite component each have a lower turnaround channel to form the turnaround, while the second side wall panels of the second composite component each have a lower second channel to form partly a lower region of the second channel, so that the return passage is made up of the first channel formed on the carriage, the upper second channel and the lower second channel.

In another aspect of the present invention, a linear motion guide unit is disclosed in which the first channel on the carriage to provide the return passage is made semicircular in cross section while the upper second channel on the first side wall panel and the lower second channel on the second side wall panel are each made a quarter segment in cross section.

In another aspect of the present invention, a linear motion guide unit is disclosed in which there are provided claws at an area where the second raceway groove on the carriage joins with the associated upper turnaround channel in the first end cap part and at another area where the second raceway groove on the carriage joins with the associated lower turnaround channel in the second end cap part, the claws serving to scoop rolling elements, which run through the ball-recirculating circuit, thereby transferring the rolling elements either from the load raceway to the associated turnaround or from turnaround to the load raceway.

In a further another aspect of the present invention, a linear motion guide unit is disclosed in which the first end cap part of the first composite component and the second end cap part of the second composite component have positioning means, respectively, which will come into fitting engagement with each other to help assemble the components with accurate positioning relation.

With the linear motion guide unit constructed as stated earlier, the slider is made up of only the carriage, and the first and second composite components. This construction results in reducing the number of parts or components required. Assembly of the carriage with the composite components is realized with the mutual fitting system, with no need of fasteners such as bolts and screws. This assembling system contributes to making the slider simple in construction and much conformable to a linear motion guide unit for use in very small machines, with even helping ensure the accurate positioning among the components and also the high precision enough to realize smooth sliding motion of the slider.

According to the linear motion guide unit of the present invention, the slider moving along the track rail is constituted with only two parts: the carriage and the composite carriage frame, the latter having the end caps and side walls, and further the two parts are assembled mutually into an unitary composite construction by only mutual engagement of fitting elements with any complementary elements, rather than using any fastener such as screws and so on. Thus, it will be said that the present invention succeeds to provide a linear motion guide unit that realizes reducing the number of components or parts needed and correspondingly making the slider itself as small as possible. The linear motion guide unit of the present invention may be made in a wide range of sizes and used in a variety of types, and therefore most favorable for machines that are very small in construction, with even requiring high precision in operation.

DETAILED DESCRIPTION OF THE PREFERRED EMBODIMENTS

Figure 1:
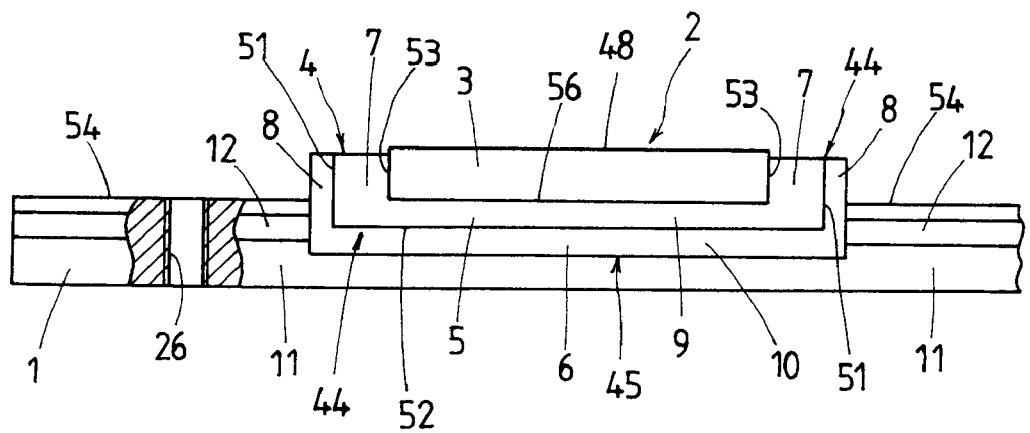
FIG. 1 is a front elevation, partially in section and partially broken away, showing a preferred embodiment of a linear motion guide unit according to the present invention.
Figure 2:
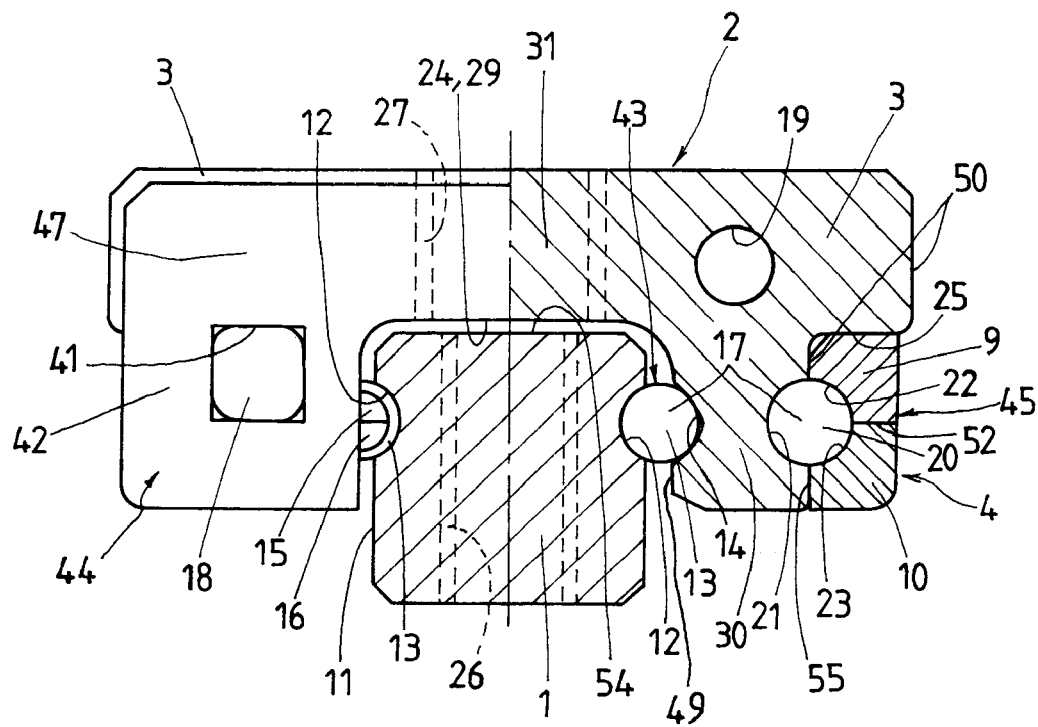
FIG. 2 is a side elevation of the linear motion guide unit of FIG. 1, with a half a composite carriage frame being cut away to illustrate a carriage in end view.
Figure 3:
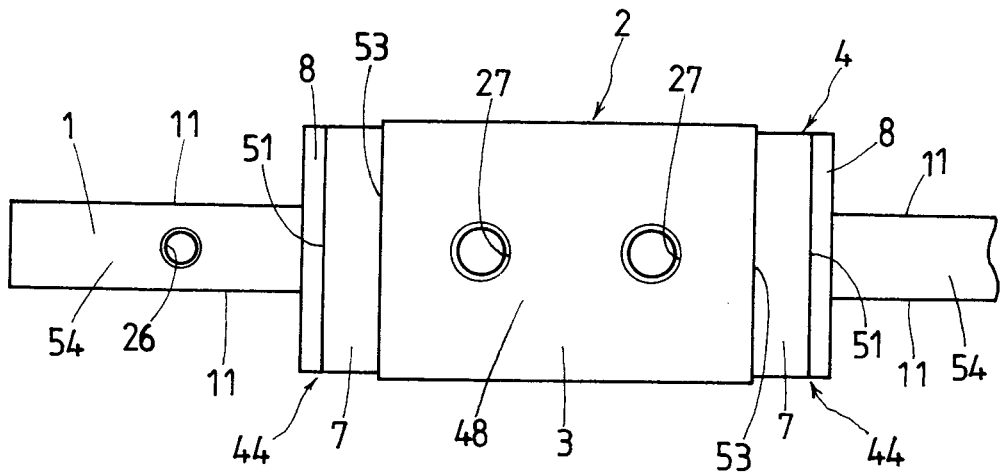
FIG. 3 is a top plan view of the linear motion guide unit of FIG. 1.
Figure 4:
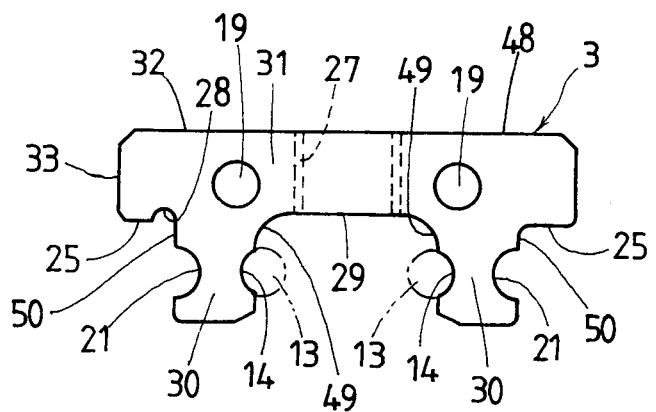
FIG. 4 is a side elevation of a carriage in the linear motion guide unit shown in FIG.1.
Figure 5:
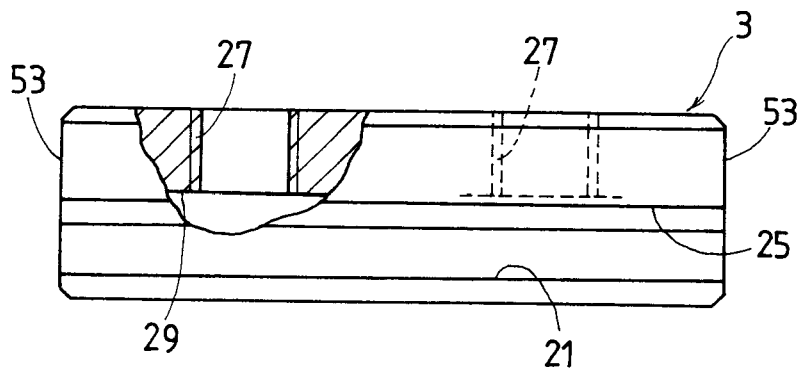
FIG. 5 is a front elevation, partly broken away, showing the carriage of FIG. 4.
Figure 6:
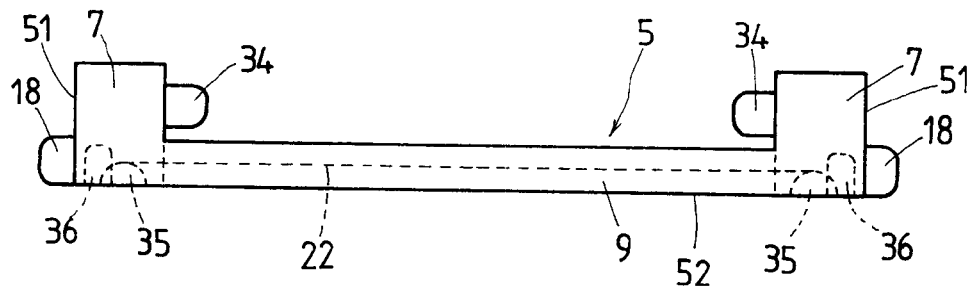
FIG. 6 is a front elevation of a first component for the composite carriage frame in the linear motion guide unit of FIG.1.
Figure 7:
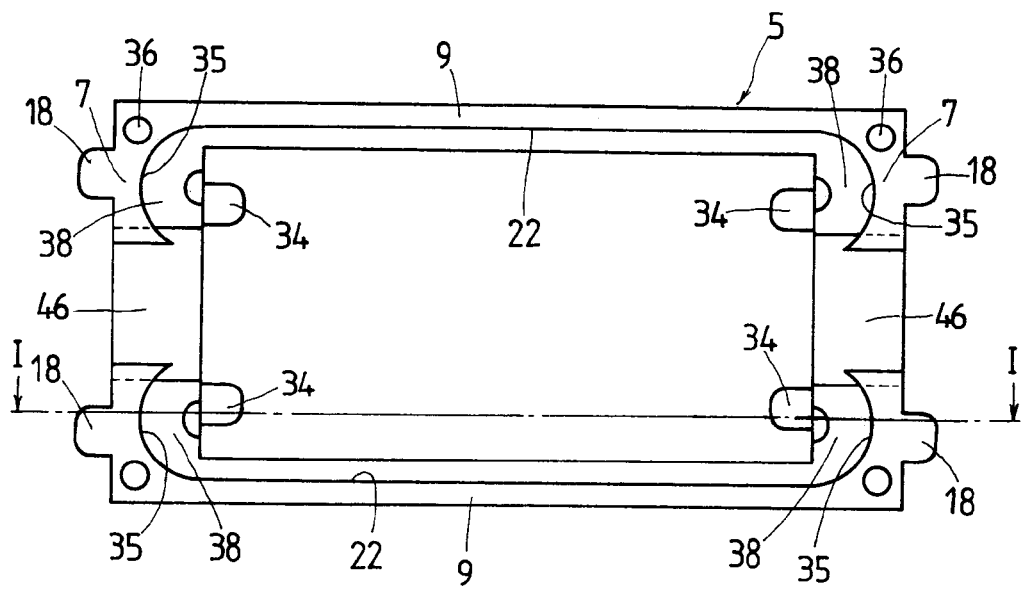
FIG. 7 is a bottom plan view of the first component of FIG. 6.
Figure 8:
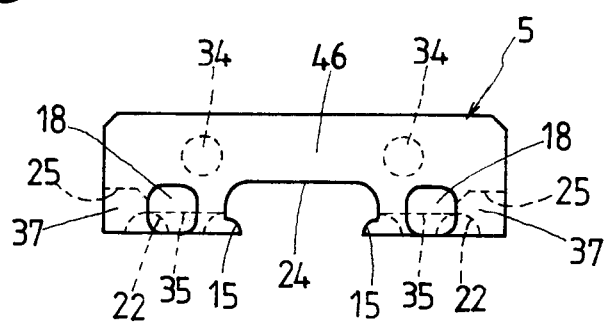
FIG. 8 is a side elevation of the first component shown in FIG. 6.
Figure 9:
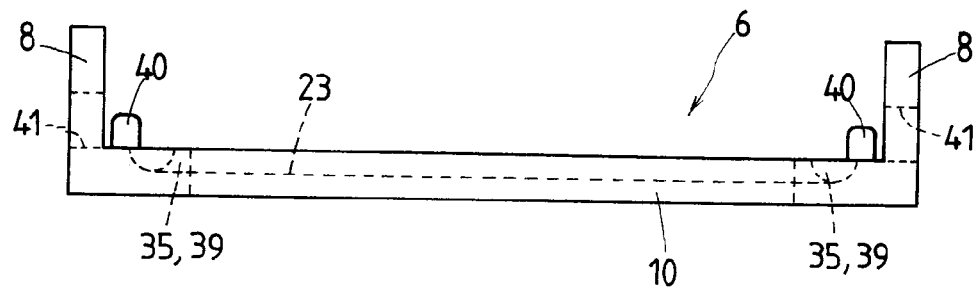
FIG. 9 is a front elevation of a second component for the composite carriage frame in the linear motion guide unit of FIG. 1.
Figure 10:
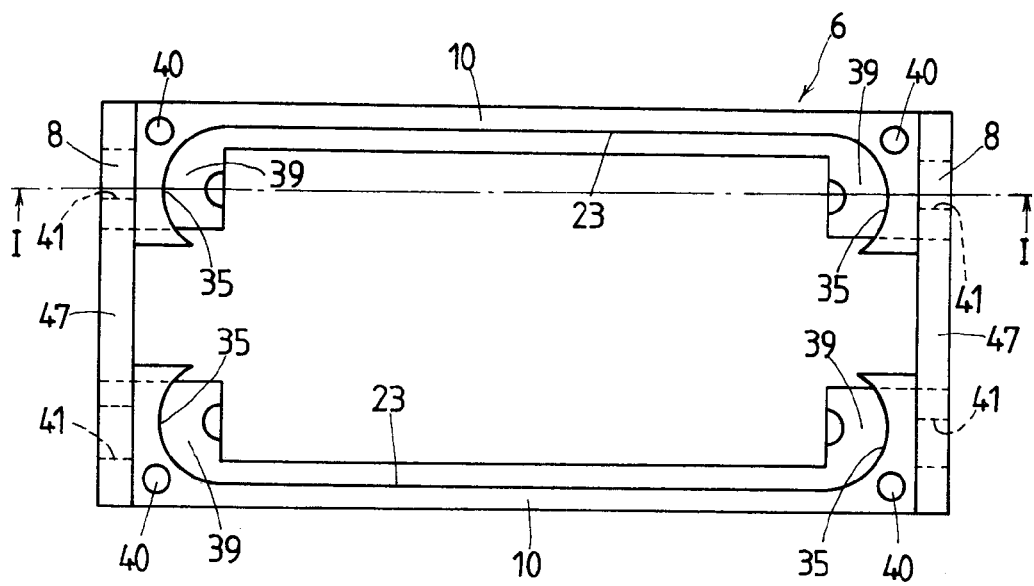
FIG. 10 is a top plan view of the second component of FIG. 9.
Figure 11:
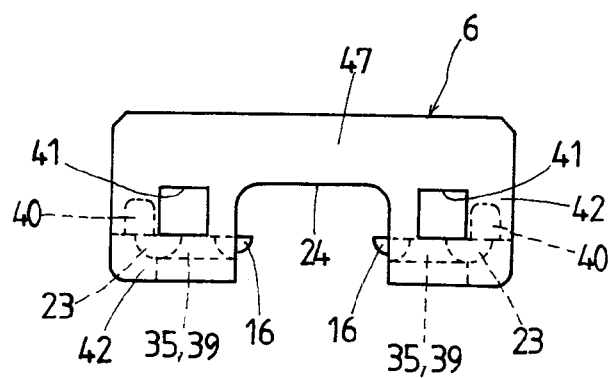
FIG. 11 is a side elevation of the second component shown in FIG. 9.

A preferred embodiment of the linear motion guide unit according to the present invention will be explained later in detail by way of example with reference to FIGS. 1 to 12.

The linear motion guide unit according of the present invention is in general comprised of a track rail 1 made on widthwise opposing sides 11 thereof with lengthwise raceway grooves 12 or first raceway grooves, one to each side, a slider 2 fitting over and conforming to the track rail 1 and made with fore-and-aft raceway grooves 14 or second raceway grooves confronting the first raceway grooves 12 to define load raceways 43 between them. The slider 2 is provided therein with return passages 20 and turnarounds 35 that are each connected at one end thereof with any one of the associated return passages 20, while at another end thereof with the associated load raceway 43, thereby completing a ball-recirculating circuit 17 allowing rolling elements 13 to run through there. The rolling element 13 may be any one of a ball and a roller, and the ball-recirculating circuit 17 is made in a configuration of a cross section consistent with the type of the desired rolling element 13, for example being made either circular for a ball or rectangular for a roller. The embodiment discussed here is the type most suitable for use in the miniature linear motion guide unit and thus the track rail 1 is made therein with fastening holes 26 having internal threads, which are usually countersunk.

The slider 2 includes a carriage 3 and a composite carriage frame 4. The carriage 3 is composed of an upper major section 31 extending fore-and-aft in opposition to and parallel with a top surface 54 of the track rail 1, and sidewise opposing wings 30 depending downward from the widthwise opposing side edges to extending over the sides 11 of the track rail 1, one to each side. The composite carriage frame 4 is composed forward and aft end caps 44 designed to fit over and conform to the track rail 1 at forward and aft ends of the carriage 3, and sidewise opposing side walls 45 made integral with the forward and aft end caps 44, each of which extends lengthwise along any one of sidewise outside surfaces 50 of the wings 30. While the upper major section 31 of the carriage 3 is made in a configuration that has a transverse cross-section uniform lengthwise throughout overall the length thereof, the composite carriage frame 4 is formed to define a window of tetragonal cavity 56 to accommodate therein the carriage 3. The wings 30 of the carriage 3 are each provided on a sidewise inside surface 49 thereof with a second raceway groove 14. The upper main section 31 together with the wings 30 make up the carriage 3 of inverted U-shape in traverse cross-section to form a recess 29 that is made open downward to allow the carriage 3 to fit over and conform to the track rail 1. In an upper surface 48 of the carriage 3 there are made more than one bolt hole 27; two holes in FIG. 3 that are used to fasten any tool or workpiece to the slider 2.

With the linear motion guide unit constructed as stated earlier, especially, the carriage 3 is made on the forward and aft ends thereof with first engaging means of concavities 19 while the end cap 44 has second engaging means of tongues 34 that will each come into fitting engagement with the associated concavity 19. In the embodiment discussed here, the concavity 19 is a circular hole and correspondingly the tongue 34 is a round pin, so that the end caps 44 are secured to the carriage 3 by the fitting engagement of the round pins into the circular holes. Moreover, the wings 30 of the carriage 3 are each made on the sidewise outside surface 50 thereof with a first channel 21 extending lengthwise of the carriage 3 while the side walls 45 are each provided on the sidewise inside surface thereof with second channels 22, 23 that extend lengthwise of the side wall 45, with confronting the first channel 21 on the wing 30 to define the return passage 20 in the slider 2 in conjunction with the first channel 20.

Thus, the first channel 21 cut in the associated wing 30 of the carriage 3 is to provide a trough semicircular in cross section for the return passage, which extends in parallel with the second raceway groove 14. At a corner where any one of the wings 30 merges into the upper major section 31 of the carriage 3, there is provided a notched mark 28 to indicate which side of the carriage 3 upper and side reference surfaces 32, 33 are provided.

Figure 12:
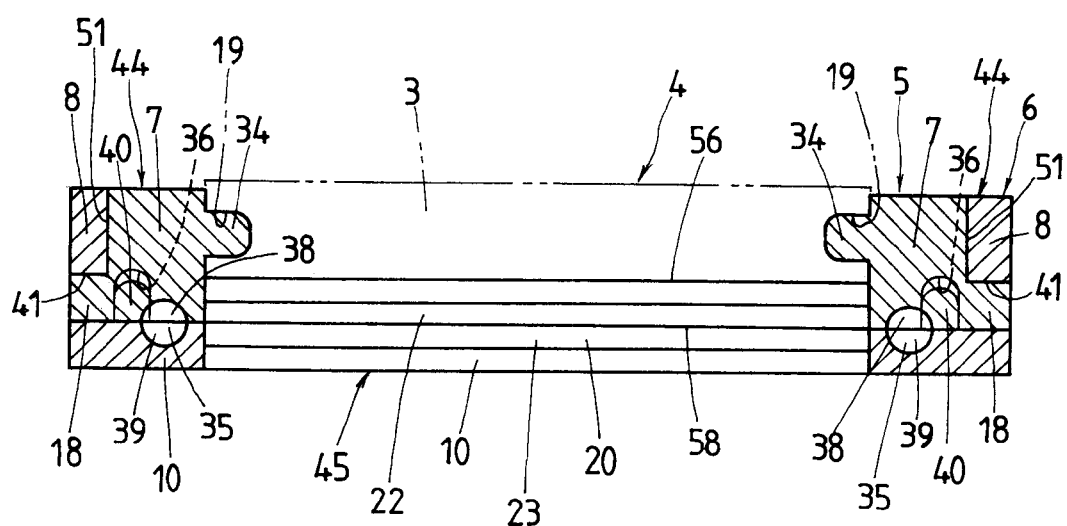
FIG. 12 is a fore-and-aft sectional view showing the composite carriage frame made up of the first and second components joined together in the linear motion guide unit of FIG. 1, taken along a plane parallel to a plane I—I of FIGS. 7 and 10 where the the first and second components are shown respectively.
Figure 13:
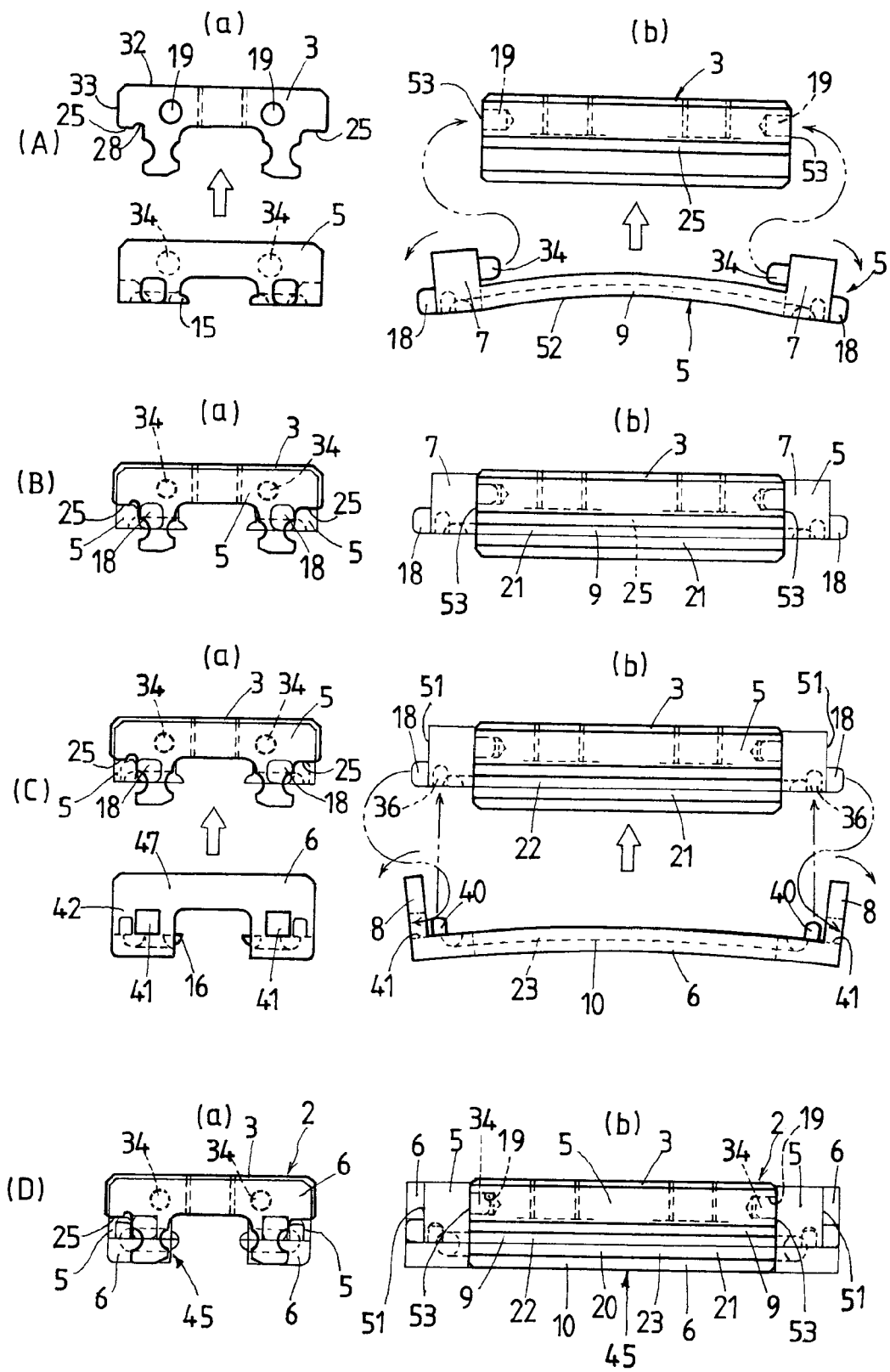
FIG. 13 is a schematic illustration explaining how to assemble the first and second components with the carriage into the linear motion guide unit shown in FIG. 1.

The first engaging means on the carriage 3 may be either the first concavity: the concavity 19 or the first convexity: any convexity. In FIGS. 12 and 13, the first engaging means on the carriage 3 are shown as being the concavities 19. The second engaging means in the end caps 44 are shown in FIGS. 6, 7, 12 and 13 as being the tongue 34 or the second convexities, each of which will fit into the associated first engaging means. As an alternative, the first engaging means on the carriage 3, although not shown, may be the convexities: the first convexities while the correspondingly the second engaging means in the end caps 44 are made in the concavities: the second concavities in which the first convexities fit to make fitting engagement with the second concavities. In the embodiment illustrated here, the convexity 34 is the round pin while the concavity 19 is the hole circular in cross section.

The composite carriage frame 4 includes an upper first composite component 5 and a lower second composite component 6. The first composite component 5 is comprised of first inside end cap parts 7 and first side wall panels 9 integral with the first end cap parts 7, while the second composite component 6 is composed of second outside end cap parts 8 and second side wall panels 10 integral with the second end cap parts 8, which are combined together to surround around both lengthwise opposite end faces 51 and bottom 52 of the first composite component 5. The first end cap parts 7 are each composed of a first crossbar section 46 and first legs 37, which are arranged to directly face the associated end face 53 of the carriage 3 and combined together to define a recess 24 of an inverted U-shape in cross section, which is made open downward. The second end cap part 8 is also composed of a second crossbar section 46 and second legs 42, which are arranged to cover over the outermost face 51 of the associated first end cap part 7 and combined together to define a recess 24 of an inverted U-shape in cross section, which is made open downward.

The first side wall panels 9 of the upper first composite component 5 fit in undercuts 25 made in sidewise outsides 50 of the carriage 3 and further the second side wall panels 10 of the lower second composite component 6 conform underneath the first side wall panels 9, with coming into abutment with both undersurfaces 52 of the first side wall panels 9 and side surfaces of the undercuts 25. The first legs 37 of the first end cap parts 7 have third engaging means: convexity 18 while the second legs 42 of the second end cap parts 8 are provided with fourth engaging means: concavity 41 complementary to the convexity 18, so that the first and second end cap parts 7, 8 may be kept in assembled relation with each other by fitting engagement of the convexity 18 into the associated concavity 41. The third engaging means on any one of the first end cap parts 7 are either a pair of the convexities 18 rectangular in cross section or, although not shown, a pair of concavities rectangular in cross section. The fourth engaging means on the second end cap part 8 are complementary to the third engaging means: either a pair of the concavities 41 rectangular in cross section or, although not shown, a pair of concavities rectangular in cross section. A pin rectangular in cross section is preferable for the convexity 18 because that such pin may be simply made large in cross section to increase the stiffness thereof and further easy to draw a distinction from other convexities.

The first end cap parts 7 of the first composite component 5 each have the second engaging means of convexities 34, and upper turnaround channels 38 to define turnarounds 35. The first side wall panels 9 of the first composite component 5 each have a second channel 22 to form the upper half of the second channel for the return passage 20. Moreover, the second end cap parts 8 of the second composite component 6 each have lower turnaround channels 39 to form the turnarounds 35. The second side wall panels 10 of the second composite component 6 each have another second channel 23 to form the lower half of the second channel for the return passage 20. The return passage 20 is made up of the first channel 21 formed on the carriage 3, the upper second channel 22 and the lower second channel 23. It will be thus understood that the first channel 21 formed on the carriage 3 is made semicircular in cross section while the upper second channel 22 on the first side wall panel 9 and the lower second channel 23 on the second side wall panel 10 are each made a quarter segment in cross section.

At an area where the second raceway groove 14 on the carriage 3 joins with the associated upper turnaround channel 38 in the first end cap part 7, there is provided an upper claw 15 to scoop rolling elements 13, which run through a ball-recirculating circuit 17, thereby transferring the rolling elements 13 either from the load raceway 43 to the associated turnaround 35 or from turnaround 35 to the load raceway 43. At an area where the second raceway groove 14 on the carriage 3 joins with the associated lower turnaround channel 39 in the second end cap part 8, there is also provided a lower claw 16 to scoop the rolling elements 13, which run through the ball-recirculating circuit 17, thereby transferring the rolling elements 13 either from the load raceway 43 to the associated turnaround 35 or from turnaround 35 to the load raceway 43. The upper and lower claws 15, 16 cooperate in transferring smoothly the rolling elements 13 at the joining area of the load raceway 43 with the associated turnaround 35, thus making sure of smooth running of the rolling elements 13 through the ball-recirculating circuit.

The first end cap part 7 of the first composite component 5 and the second end cap part 8 of the second composite component 6 have positioning means 36, 40, respectively, which will come into interlocking engagement with each other to help assemble together the components with accurate positioning relation. With the embodiment illustrated here, the positioning means 36 on the first end cap part 7 of the first composite component 5 is shown as being a concavity, whereas the positioning means 40 on the second end cap part 8 of the second composite component 6 is a convexity complementary to the concavity 36. According the embodiment shown here, there are made the concavities 36 at the four corners of first end cap part 7 while the convexities 40 are arranged at the four corners of the second end cap part 8 in conformity with the concavities 36. As an alternative, the first end cap part 7 may be made with the convexity while the second end cap part 8 has the concavity.

The composite carriage frame 4 may be provided by the combination of the first composite component 5 with the second composite component 6 as shown in FIG. 13. The slider 2 of the present invention will be completed according to assembling steps made through the sequence of from (A) to (D) in FIG. 13. The figures labeled (a) are side or end elevations showing the first composite component 5, second composite component 6 and the carriage 3, while the figures labeled (b) are front elevations of the first composite component 5, second composite component 6 and the carriage 3. For assembly of the composite carriage frame 4 with the carriage 3, the side walls 45 of the composite carriage frame 4 are first forced to warp backward elastically to allow the end caps 44 of the composite carriage frame 4 to embrace the forward and aft ends or end faces 53 of the carriage 3 between them. Fitting engagement of the second engaging means or the convexity 34 of the composite carriage frame 4 into the first engaging means or the concavity 19 of the carriage 3 makes sure of secure connection of the composite carriage frame 4 with the carriage 3.

In detail, the first side walls 9 of the first composite component 5, as shown in FIG. 13(A), is first deformed elastically to expand the distance separating the lengthwise opposing convexities 34 on the end cap parts 7 of the first composite component 5 from one another to the extent beyond the overall length of the carriage 3. Then, the carriage 3, as shown in FIG. 13(B), is accommodated in the first composite component 5 with the sidewise opposing first side wall panels 9 being each placed into the associated undercut 25 made in the carriage 3. At the same time the first side wall panels 9 are released from the elastic stress or deformation to recover their original condition whereby the convexities 34 are forced into their associated concavities 19 to make sure of the fitting engagement to hold the first composite component 5 around the carriage 3.

The first half of the assembling steps stated earlier is followed by mounting the second composite component 6 on first composite component 5 that has fit over the carriage 3. To this end, the second side wall panels 10 of the second composite component 6, as illustrated in FIG. 13(C), is forced to warp backward elastically to expand the distance separating the forward and aft second end cap part 8 of the second composite component 6 from one another to the extent beyond the overall length of the first composite component 5. Then the second composite component 6, as shown in FIG. 13(D), is released from the elastic stress or backward bent condition to recover their original posture, with the second side panels 10 of the second composite component 6 lying abutted against the first side panels 9 of the first composite component 5. in At the same time the convexities 18 raised lengthwise outside above the end faces 51 of the forward and aft end cap parts 7 are forced into their associated concavities 41 of the second end cap parts 8 to make sure of the fitting engagement to hold the second composite component 6 underneath the first composite component 5. Finally more than one rolling elements are charged into the ball-recirculating circuits including the load raceways 43, turnarounds 35 and return passages 20, which are provided by the united carriage 3 with both the first and second composite components 5, 6. The slider 2 will be completed according to the assembling steps stated earlier.

Although but only one slider 2 is shown as riding astride the single track rail 1 in the illustrative embodiment of the linear motion guide unit stated above, it will be appreciated that any number of the sliders may be used in a way riding astride on each of the track rails 1. With the linear motion guide unit constructed as explained above, the slider 2 is described as being assembled on the track rail 1. But the slider 2 alone can be first completed then, followed by the assembling step with the track rail 1. For example, the slider 2 may be assembled on any dummy track rail. The use of the dummy track rail rather than real one is often expected while the slider 2 is charged with the roller elements 13 preparatory to fitting over the track rail 1 or before the linear motion guide unit is transported to any sites as there is provided no retainer or retainer band to keep the rolling elements against escape out of the slider 2. According to the embodiment of the assembling steps stated earlier, the first composite 5 fits over the carriage 3 then, followed by fitting in the second composite component 6. But it will be appreciated as an alternative that the first composite component 5 is first combined with the second composite component 6 to make the composite carriage frame 4, which has then accommodated therein the carriage 3.

What is claimed is:

1. A linear motion guide unit; comprising a track rail having first raceway grooves on lengthwise sides thereof, a slider conforming to the track rail to fit over the track rail for movement relatively to the track rail and also having second raceway grooves confronting the first raceway grooves, and recirculating circuit allowing rolling elements to run through there, the recirculating circuit including a load raceway defined between the first and second raceway grooves, a turnaround formed in the slider and connected at any one end thereof with the load raceway, and a return passage formed in the slider and connected to another end of the turnaround;

wherein the slider is composed of a carriage including an upper major section extending in opposition to and parallel with an upper surface of the track rail and sidewise opposing wings depending downward from widthwise opposing side edges of the upper major section to extend over the lengthwise sides of the track rail, one to each side, and a composite carriage frame including end caps arranged on forward and aft ends of the carriage, one to each end, and side walls integral with the end caps and extending along sidewise outside surfaces of the carriage;

wherein the carriage has on the forward and aft ends thereof first engaging means, while the end caps have second engaging means that will come into fitting engagement with the first engaging means, wherein the first engaging means on the carriage is any one of first concavity and convexity, while the second engaging means on the end cap is any one of second convexity and concavity, which is complementary to the first engaging means to make fitting engagement between them, and wherein the convexity, whether the first or the second, is a pin circular in cross section and the concavity, whether the first or the second, is a hole circular in cross section.

2. A linear motion guide unit constructed as defined in claim 1 wherein the return passage in the slider is constituted with a first channel made lengthwise on the sidewise outside surface of any one of the wings of the carriage, and a second channel made lengthwise on an inside surface of any one of the side walls in opposition to the first channel.

3. A linear motion guide unit constructed as defined in claim 2 wherein the first channel on the wing of the carriage is made semicircular in cross section and arranged to provide the return passage extending in parallel with the associated second raceway groove.

4. A linear motion guide unit constructed as defined in claim 1 wherein at a corner where any one of the wings merges into the upper major section of the carriage there is provided a notched mark to indicate which side of the carriage is made with upper and side reference surfaces.

5. A linear motion guide unit constructed as defined in claim 1 wherein the upper major section of the carriage is made in a configuration that has a transverse cross-section uniform lengthwise throughout overall the length thereof.

6. A linear motion guide unit constructed as defined in claim 1 wherein the composite carriage frame forms a window capable of accommodating the carriage.

7. A linear motion guide unit constructed as defined in claim 1 wherein the rolling element is any one of a ball and a roller.

8. A linear motion guide unit comprising a track rail having first raceway grooves on lengthwise sides thereof, a slider conforming to the track rail to fit over the track rail for movement relatively to the track rail and also having second raceway grooves confronting the first raceway grooves, and a recirculating circuit allowing rolling elements to run through there, the recirculating circuit including a load raceway defined between the first and second raceway grooves, a turnaround formed in the slider and connected at any one end thereof with the load raceway, and a return passage formed in the slider and connected to another end of the turnaround;

wherein the slider is composed of a carriage including an upper major section extending in opposition to and parallel with an upper surface of the track rail and sidewise opposing wings depending downward from widthwise opposing side edges of the upper major section to extend over the lengthwise sides of the track rail, one to each side, and a composite carriage frame including end caps arranged on forward and aft ends of the carriage, one to each end, and side walls integral with the end caps and extending along sidewise outside surfaces of the carriage;

wherein the carriage has on the forward and aft ends thereof first engaging means, while the end caps have second engaging means that will come into fitting engagement with the first engaging means, and wherein the composite carriage frame is made warped elastically to allow the lengthwise opposing end caps to embrace the forward and aft ends of the carriage, whereby the second engaging means of the composite carriage frame come into fitting engagement with the first engaging means of the carriage to unite the composite carriage frame with the carriage.

9. A linear motion guide unit constructed as defined in claim 8 wherein the rolling element is any one of a ball and a roller.

10. A linear motion guide unit; comprising a track rail having first raceway grooves on lengthwise sides thereof, a slider conforming to the track rail to fit over the track rail for movement relatively to the track rail and also having second raceway grooves confronting the first raceway grooves, and a recirculating circuit allowing rolling elements to run through there, the recirculating circuit including a load raceway defined between the first and second raceway grooves, a turnaround formed in the slider and connected at any one end thereof with the load raceway, and a return passage formed in the slider and connected to another end of the turnaround;

wherein the slider is composed of a carriage including an upper major section extending in opposition to and parallel with an upper surface of the track rail and sidewise opposing wings depending downward from widthwise opposing side edges of the upper major section to extend over the lengthwise sides of the track rail, one to each side, and a composite carriage frame including end caps arranged on forward and aft ends of the carriage, one to each end, and side walls integral with the end caps and extending along sidewise outside surfaces of the carriage;

wherein the carriage has on the forward and aft ends thereof first engaging means, while the end caps have second engaging means that will come into fitting engagement with the first engaging means, and wherein the composite carriage frame is composed of a first composite component that is made up of first inside end cap parts and first side wall panels integral with the first inside end cap parts, and a second composite component that is made up of second outside end cap parts and second outside side wall panels integral with the second outside end cap parts.

11. A linear motion guide unit constructed as defined in claim 10 wherein the first end cap part is composed of a first crossbar section and first legs, which are arranged to directly face the associated end face of the carriage, and the second end cap part is also composed of a second crossbar section and second legs, which are arranged to cover over the outermost face of the first end cap part.

12. A linear motion guide unit constructed as defined in claim 11 wherein the legs of the first end cap part are provided with third engaging means, while the second legs of the second end cap part are provided with fourth engaging means complementary to the third engaging means, so that fitting engagement between the third and fourth engaging means makes sure of joining together the first end cap part with the second end cap part.

13. A linear motion guide unit constructed as defined in claim 12 wherein the third engaging means is either a pair of convexities rectangular in cross section or a pair of concavities rectangular in cross section, while the fourth engaging means is either a pair of concavities rectangular in cross section or a pair of convexities rectangular in cross section, which are complementary to the third engaging means.

14. A linear motion guide unit constructed as defined in claim 10 wherein the first end cap parts of the first composite component each have the second engaging means, and an upper turnaround channel to define the turnaround, while the first side wall panels of the first composite component each have an upper second channel to form partly an upper region of the second channel, and further the second end cap parts of the second composite component each have a lower turnaround channel to form the turnaround, while the second side wall panels of the second composite component each have a lower second channel to form partly a lower region of the second channel, so that the return passage is made up of the first channel formed on the carriage, the upper second channel and the lower second channel.

15. A linear motion guide unit constructed as defined in claim 14, wherein the first channel on the carriage to provide the return passage is made semicircular in cross section while the upper second channel on the first side wall panel and the lower second channel on the second side wall panel are each made a quarter segment in cross section.

16. A linear motion guide unit constructed as defined in claim 14 wherein there are provided claws at an area where the second raceway groove on the carriage joins with the associated upper turnaround channel in the first end cap part and at another area where the second raceway groove on the carriage joins with the associated lower turnaround channel in the second end cap part, the claws serving to scoop rolling elements, which run through the ball-recirculating circuit, thereby transferring the rolling elements either from the load raceway to the associated turnaround or from turnaround to the load raceway.

17. A linear motion guide unit constructed as defined in claim 10 wherein the first side wall panels fit in undercuts made in sidewise outsides of the carriage to provide upper halves of the side walls and further the second side wall panels conform underneath the first side wall panels, with coming into abutment with both undersurfaces of the first side wall panels and outside surfaces of the undercuts thereby providing lower halves of the side walls.

18. A linear motion guide unit constructed as defined in claim 10 wherein the first end cap part of the first composite component and the second end cap part of the second composite component have positioning means, respectively, which will come into fitting engagement with each other to help assemble together the components with accurate positioning relation.

19. A linear motion guide unit constructed as defined in claim 10 wherein the rolling element is any one of a ball and a roller.

* * * * *